United States Patent
Caliskan et al.

(10) Patent No.: US 10,773,602 B2
(45) Date of Patent: Sep. 15, 2020

(54) ELECTRIFIED VEHICLES WITH REMOVABLE AND INTERCHANGEABLE RANGE EXTENDING GENERATORS

(71) Applicant: FORD GLOBAL TECHNOLOGIES, LLC, Dearborn, MI (US)

(72) Inventors: Ari Caliskan, Canton, MI (US); John Jaranson, Dearborn, MI (US); Peter A. Friedman, Ann Arbor, MI (US); Arnold Kadiu, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 8 days.

(21) Appl. No.: 15/963,202

(22) Filed: Apr. 26, 2018

(65) Prior Publication Data

US 2019/0329657 A1 Oct. 31, 2019

(51) Int. Cl.
*B60K 8/00* (2006.01)
*B60L 53/14* (2019.01)
*B60L 50/61* (2019.01)

(52) U.S. Cl.
CPC .............. *B60L 53/14* (2019.02); *B60K 8/00* (2013.01); *B60L 50/61* (2019.02); *B60L 2200/36* (2013.01)

(58) Field of Classification Search
CPC .................................................. B60L 11/1809
See application file for complete search history.

(56) References Cited

U.S. PATENT DOCUMENTS

| | | | |
|---|---|---|---|
| 6,571,949 B2 | 6/2003 | Burrus, IV et al. | |
| 6,596,941 B2 | 7/2003 | Tripoli | |
| 7,475,747 B2* | 1/2009 | Plishner | B60K 6/46 180/65.31 |
| 7,514,803 B2* | 4/2009 | Wilks | B60L 11/1822 180/165 |
| 9,290,098 B2 | 3/2016 | Nguyen | |
| 9,393,857 B1* | 7/2016 | Theobald | B60K 16/00 |
| 9,457,666 B2* | 10/2016 | Caldeira | B60L 3/0046 |
| 2002/0163196 A1* | 11/2002 | Brofft | B23K 9/1006 290/1 A |
| 2006/0000650 A1* | 1/2006 | Hughey | B60K 6/26 180/65.25 |
| 2009/0223725 A1* | 9/2009 | Rodriguez | B60K 6/40 180/65.21 |
| 2011/0226539 A1* | 9/2011 | Huss | B60K 6/46 180/65.21 |
| 2012/0303397 A1* | 11/2012 | Prosser | H02J 7/0054 705/7.12 |

(Continued)

FOREIGN PATENT DOCUMENTS

DE 10-2015-005318 A1 10/2016

*Primary Examiner* — James A Shriver, II
*Assistant Examiner* — James J Triggs
(74) *Attorney, Agent, or Firm* — David B. Kelley; Carlson, Gaskey & Olds

(57) ABSTRACT

This disclosure details electrified vehicles that are equipped with removable generators for increasing the electric range of the vehicles. An exemplary electrified vehicle includes a cargo space, such as a truck bed, and a generator removably positioned within the cargo space. The generator is adapted to selectively supply power for either charging a battery pack of the electrified vehicle or for propelling one or more vehicle drive wheels. In some embodiments, the generator is shaped like, and therefore disguised as, a toolbox.

16 Claims, 5 Drawing Sheets

(56) References Cited

U.S. PATENT DOCUMENTS

2015/0015065 A1\* 1/2015 Brunais .................... B60L 3/00
　　　　　　　　　　　　　　　　　　　　　　307/10.8
2015/0210152 A1\* 7/2015 Arkus ................ B60L 11/1809
　　　　　　　　　　　　　　　　　　　　　　180/65.245
2016/0009232 A1　　1/2016 Budny \* cited by examiner

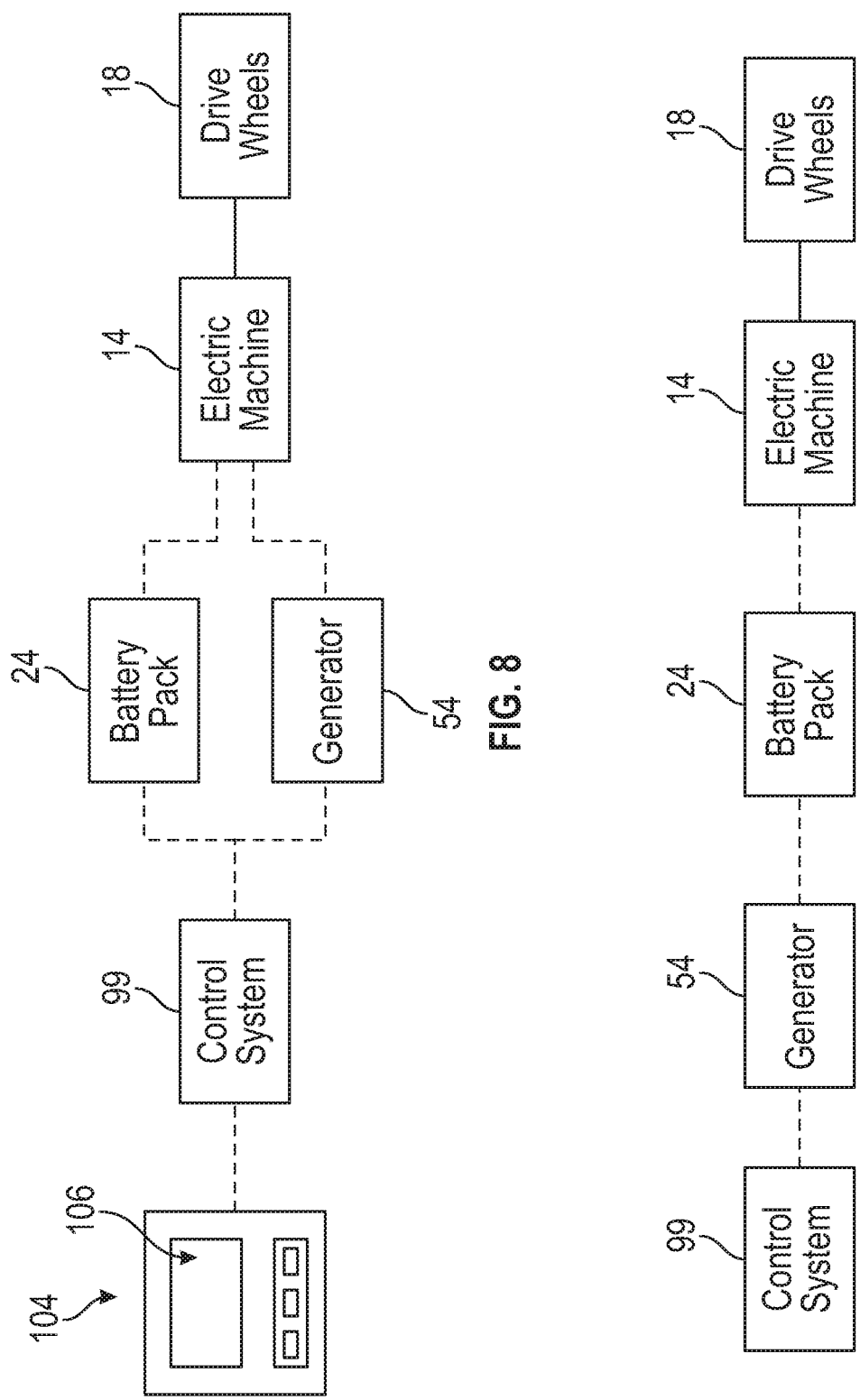

ELECTRIFIED VEHICLES WITH REMOVABLE AND INTERCHANGEABLE RANGE EXTENDING GENERATORS

TECHNICAL FIELD

This disclosure details electrified vehicles that are equipped with removable generators for increasing the electric range of the vehicles.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The high voltage battery pack provides a limited amount of electric-only driving range. Some customers desire the ability to add additional electric-only range to their electrified vehicles.

SUMMARY

An electrified vehicle according to an exemplary aspect of the present disclosure includes, among other things, a drive wheel, a battery pack, a cargo space, and a generator removably positioned within the cargo space and adapted to selectively output power for either charging the battery pack or propelling the drive wheel. The generator is shaped like a toolbox.

In a further non-limiting embodiment of the foregoing electrified vehicle, the electrified vehicle is a pickup truck.

In a further non-limited embodiment of either of the foregoing electrified vehicles, the cargo space is established by a truck bed of the pickup truck.

In a further non-limited embodiment of any of the foregoing electrified vehicles, at least a portion of a bottom wall of the generator is spaced a distance above a floor of the cargo space.

In a further non-limited embodiment of any of the foregoing electrified vehicles, the generator includes an enclosure that houses an engine and a fuel tank.

In a further non-limited embodiment of any of the foregoing electrified vehicles, the enclosure further houses an exhaust system and electronics of the generator.

In a further non-limited embodiment of any of the foregoing electrified vehicles, the vehicle includes a connection system for electrically connecting the generator to a voltage bus of the electrified vehicle.

In a further non-limited embodiment of any of the foregoing electrified vehicles, the connection system includes a vehicle-side connector and a generator-side connector.

In a further non-limited embodiment of any of the foregoing electrified vehicles, the vehicle-side connector is recessed into a floor of the cargo space and the generator-side connector protrudes from a bottom wall of the generator.

In a further non-limited embodiment of any of the foregoing electrified vehicles, the vehicle-side connector is a female connector and the battery-side connector is a male connector.

In a further non-limited embodiment of any of the foregoing electrified vehicles, the generator includes locating studs received within openings of the cargo space.

In a further non-limited embodiment of any of the foregoing electrified vehicles, the generator is interchangeable with a second generator that includes a different power capacity compared to the generator.

In a further non-limited embodiment of any of the foregoing electrified vehicles, the generator is connected in series relative to the battery pack.

In a further non-limited embodiment of any of the foregoing electrified vehicles, a control system is configured to control the power outputted by each of the battery pack and the generator during a drive cycle.

In a further non-limited embodiment of any of the foregoing electrified vehicles, a human machine interface is in communication with the control system and configured to receive an operating mode input for controlling the generator during the drive cycle.

A method according to another exemplary aspect of the present disclosure includes, among other things, positioning a generator within a cargo space of an electrified vehicle. The generator is disguised as a toolbox. Power from the generator may be output for either propelling a wheel of the electrified vehicle or charging a battery pack of the electrified vehicle.

In a further non-limiting embodiment of the foregoing method, the method includes outputting the power from the generator and power from the battery pack in parallel.

In a further non-limiting embodiment of either of the foregoing methods, outputting the power from the generator is only performed when a state of charge of the battery pack falls below a threshold level.

In a further non-limiting embodiment of any of the foregoing methods, positioning the generator within the cargo space includes connecting a vehicle-side connector to a generator-side connector.

In a further non-limiting embodiment of any of the foregoing methods, the method includes removing the generator from the cargo space and replacing the generator with a second generator that has a different power capacity than the generator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 8 illustrates an electric drive system according to a first embodiment of this disclosure.

FIG. 9 illustrates an electric drive system according to a second embodiment of this disclosure.

DETAILED DESCRIPTION

This disclosure details electrified vehicles that are equipped with removable generators for increasing the electric range of the vehicles. An exemplary electrified vehicle includes a cargo space, such as a truck bed, and a generator removably positioned within the cargo space. The generator is adapted to selectively supply power for either charging a battery pack of the electrified vehicle or for propelling one or more vehicle drive wheels. In some embodiments, the generator is shaped like, and therefore disguised as, a toolbox. These and other features are discussed in greater detail in the following paragraphs of this detailed description.

Figure 1:
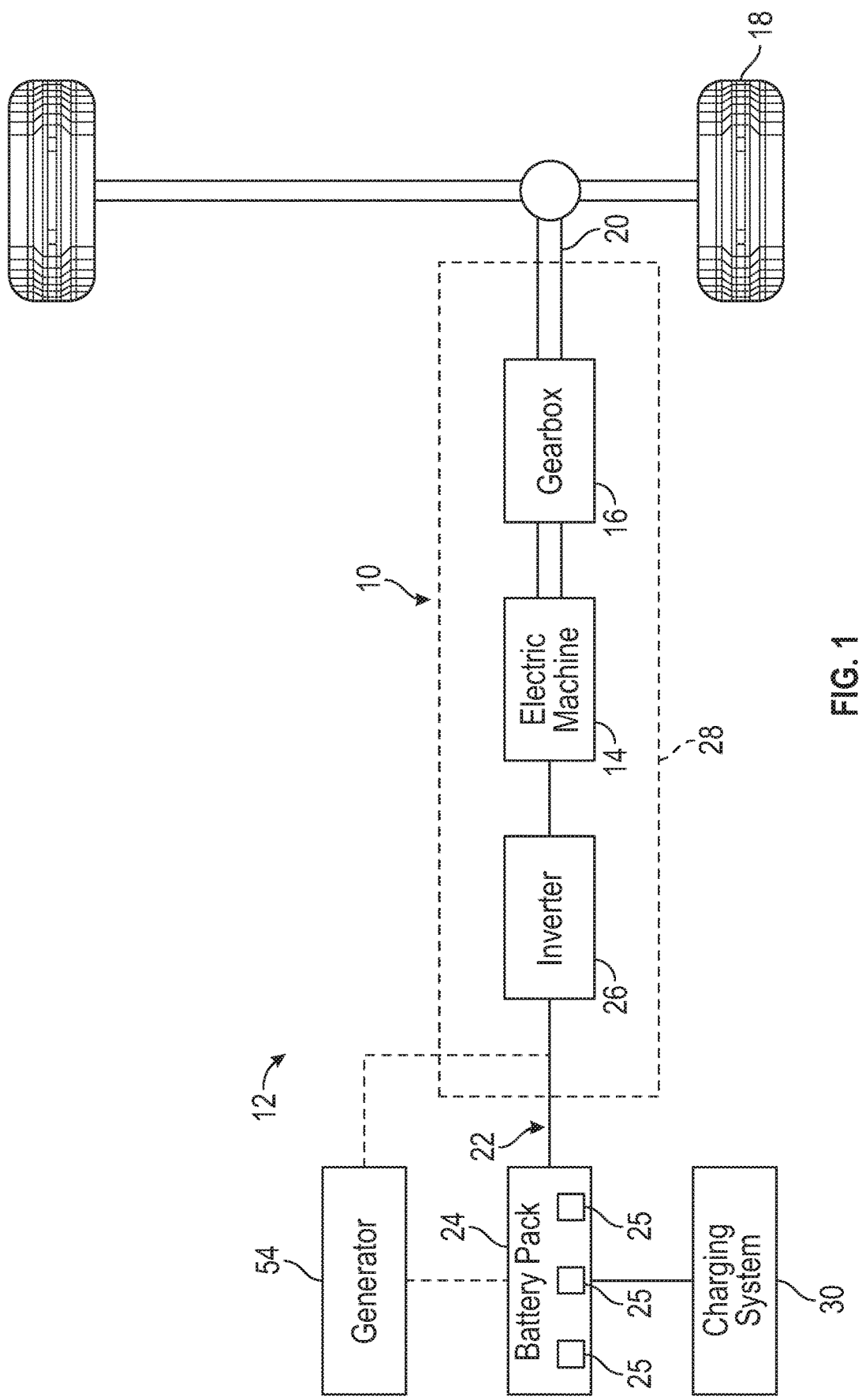
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV) that is propelled solely through electric power, such as by an electric machine 14, without any assistance from an internal combustion engine. The electric machine 14 receives electrical power and provides a rotational output power. In an embodiment, the electric machine 14 is an electric motor.

The electric machine 14 may be connected to a gearbox 16 for adjusting the output torque and speed of the electric machine 14 by a predetermined gear ratio. The gearbox 16 is connected to a set of drive wheels 18 by an output shaft 20. A voltage bus 22 electrically connects the electric machine 14 to a battery pack 24 through an inverter 26. The electric machine 14, the gearbox 16, and the inverter 26 may be collectively referred to as a transmission 28.

The battery pack 24 is an exemplary electrified vehicle battery. The battery pack 24 may be a high voltage traction battery pack that includes a plurality of battery arrays 25 (i.e., battery assemblies or groupings of battery cells) capable of outputting electrical power to operate the electric machine 14 and/or other electrical loads of the electrified vehicle 12 for providing the power necessary to propel the wheels 18. Other types of energy storage devices and/or output devices can also be used to electrically power the electrified vehicle 12.

The electrified vehicle 12 is also be equipped with a charging system 30 for charging the energy storage devices (e.g., battery cells) of the battery pack 24. The charging system 30 can be connected to an external power source for receiving and distributing power received from the external power source to the battery pack 24.

The electrified vehicle 12 may be operable to travel over a specific distance prior to energy depletion of the battery pack 24, which may lead to operator range anxiety. Accordingly, the electrified vehicle 12 may additionally be equipped with a generator 54 for increasing the travel range of the electrified vehicle 12. Like the battery pack 24, the generator 54 may be operably connected to the electric machine 14 through the inverter 26 over the voltage bus 22. The generator 54 may also be connected either in parallel or in series relative to the battery pack 24. As discussed in greater detail below, the generator 54 may be a gasoline driven generator that is removable and interchangeable.

The powertrain 10 shown in FIG. 1 is highly schematic and is not intended to limit this disclosure. Various additional components could alternatively or additionally be employed by the powertrain 10 within the scope of this disclosure. In addition, the teachings of this disclosure may be incorporated into any type of electrified vehicle, including but not limited to trucks, sport utility vehicles, cars, etc.

Figure 2:
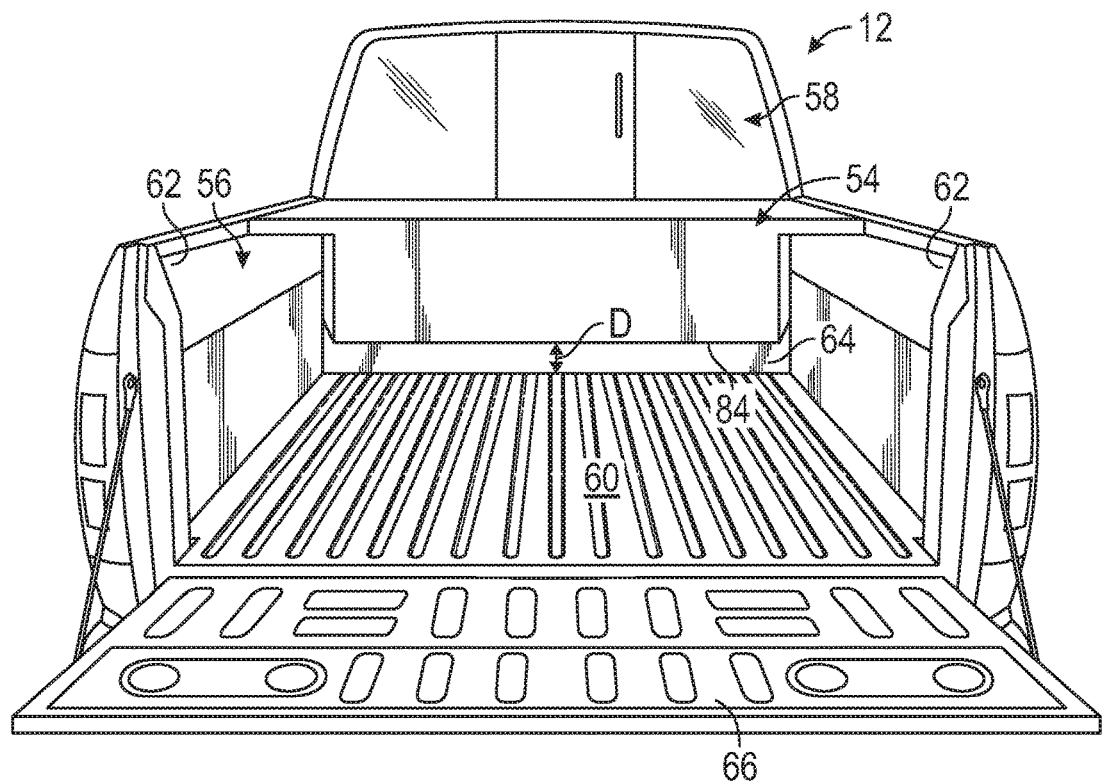
FIG. 2 illustrates an electrified vehicle that may employ the powertrain of FIG. 1.

FIG. 2 illustrates an electrified vehicle 12 that may employ the powertrain 10 shown in FIG. 1, or any other electrified powertrain. In an embodiment, the electrified vehicle 12 is a pickup truck. Although a specific component relationship is illustrated in the figures of this disclosure, the illustrations are not intended to limit this disclosure. The placement and orientation of the various components of the electrified vehicle 12 are shown schematically and could vary within the scope of this disclosure. In addition, the various figures accompanying this disclosure are not necessarily to scale, and some features may be exaggerated or minimized to show certain details of a particular component.

The electrified vehicle 12 includes a truck bed 56 that establishes a cargo space for storing and hauling cargo at a rear location of the electrified vehicle 12. The truck bed 56 is generally rearward of a passenger cabin 58 of the electrified vehicle 12 and includes a floor 60 extending between a pair of longitudinally extending side walls 62, a laterally extending front wall 64, and a tailgate 66. The tailgate 66 is moveable between a closed position (not shown) and a deployed or open position. When in the closed position, the tailgate 66 generally encloses an end of the truck bed 56 that is opposite from the front wall 64 to prevent cargo from sliding out of the truck bed 56. When in the open position, the tailgate 66 is generally horizontal and thus parallel to ground level such that cargo can be loaded onto or unloaded from the truck bed 56.

The generator 54 may be positioned within the truck bed 56, such as near the front wall 64. In an embodiment, the generator 54 is shaped like, and therefore disguised as, a toolbox. Disguising the generator 54 as a toolbox gives the customer the option to add additional electric range to the electrified vehicle 12 without sacrificing any more cargo space than would be taken up by a traditional saddle style truck bed toolbox. In the installed position, at least a portion of a bottom wall 84 of the generator 54 may be spaced a distance D above the floor 60 of the truck bed 56. Therefore, cargo may be slid underneath the generator 54 even when the electrified vehicle 12 is equipped with the generator 54.

Figure 3:
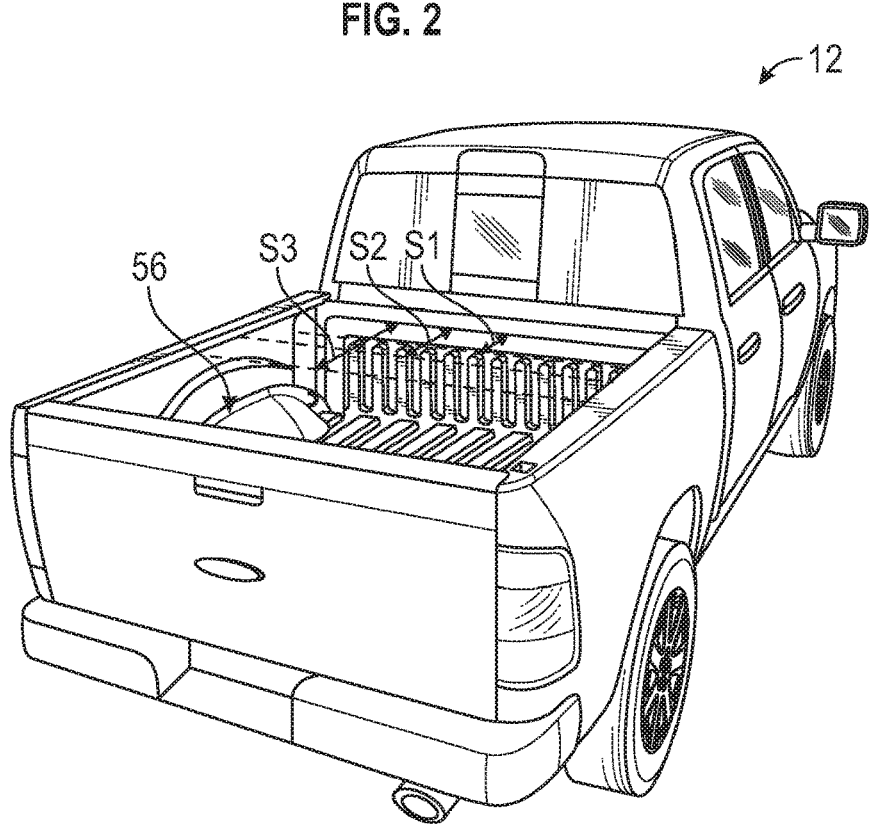
FIG. 3 schematically illustrates the interchangeability of different sized generators that may be employed by the electrified vehicle of FIG. 2.

Referring to FIGS. 2-3, the generator 54 may be removable from the truck bed 56 and interchanged with different sized generators to accommodate the specific energy needs of the customer/user. In such a modular design, the customer/user could employ a small (e.g., 5 kW with 5 gallon capacity), medium (e.g., 5 kW with 10 gallon capacity), or large (e.g., 15 kW with 20 gallon capacity) generator 54 within the truck bed 56. The small generator 54 may occupy a first amount of space S1 of the truck bed 56, the medium generator 54 may occupy a second amount of space S2 of the truck bed 56, and the large generator 54 may occupy a third amount of space S3 of the truck bed 56. The second amount of space S2 is greater than the first amount of space S1, and the third amount of space S3 is greater than the second amount of space S2. Increasing the travel range of the electrified vehicle 12, such as by using a larger-sized generator 54, may therefore reduce the amount of available cargo space within the electrified vehicle 12.

Figure 4:
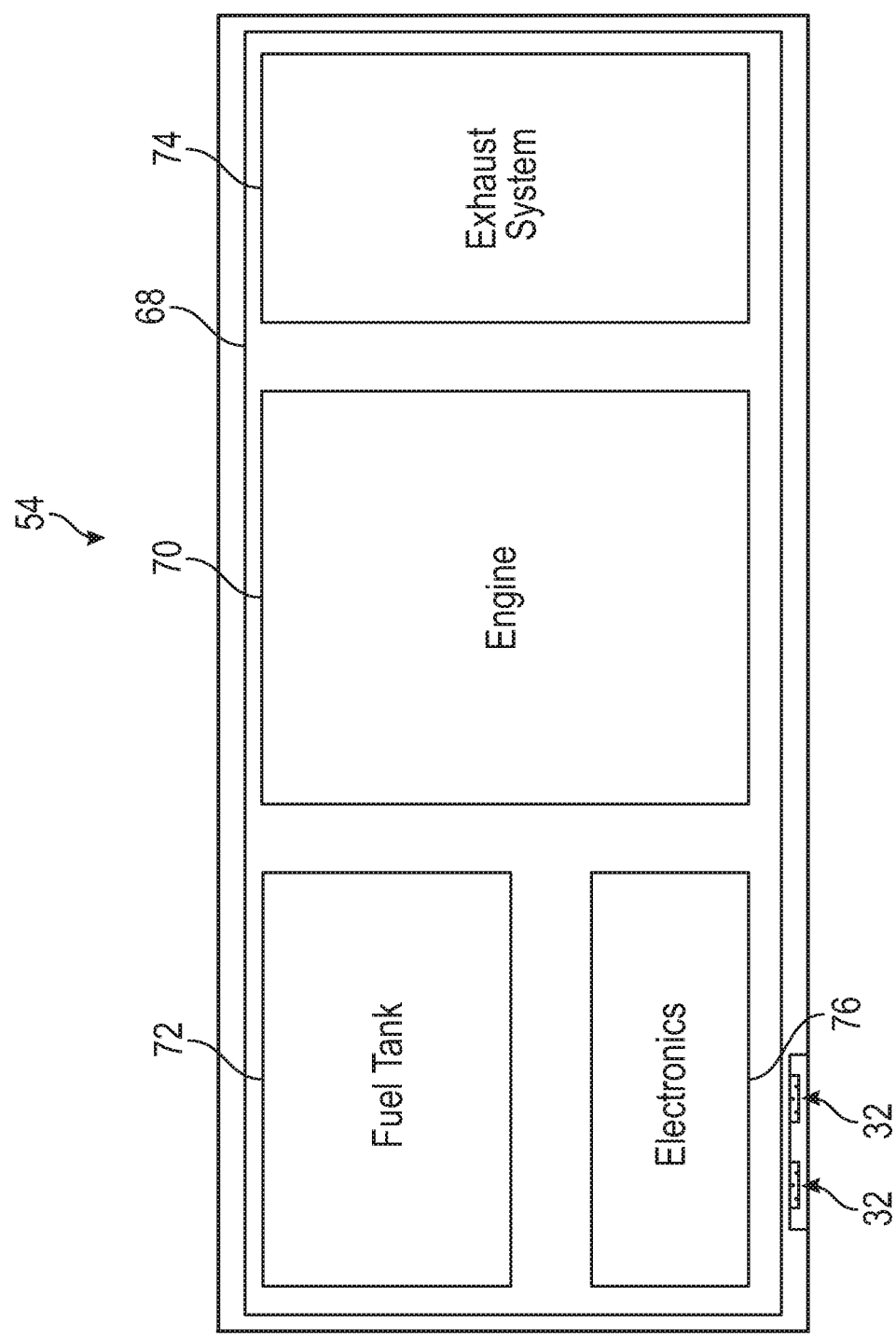
FIG. 4 illustrates a generator of the electrified vehicle of FIG. 2.

FIG. 4 illustrates additional features of the exemplary generator 54 of FIG. 2. FIG. 4 is a top, cross-sectional view of the generator 54 for visualizing its internal contents. In an embodiment, the generator 54 includes an enclosure 68 that houses an engine 70 or other power source, a fuel tank 72, an exhaust system 74, and various electronics 76. Other components could additionally be housed inside the enclosure 68 within the scope of this disclosure.

The enclosure 68 may be shaped like a toolbox in order to disguise the generator 54 as a truck bed toolbox. The enclosure 68 may be constructed of a polymer-based material, a metallic material, or a combination of polymer-based and metallic materials. However, the actual size, shape, and material make-up of the enclosure 68 are not intended to limit this disclosure.

The engine 70 is the main power source of the generator 54. During operation, the engine 70 creates mechanical energy that is converted into electrical energy that can be outputted by the generator 54. The operating specifications of the engine 70 are design specific and can be selected to provide a desired electrical energy output.

The fuel tank 72 stores fuel for powering the engine 70. In an embodiment, the fuel is gasoline. However, other fuels are also contemplated within the scope of this disclosure, including but not limited to, diesel, propane, natural gas, or any combination of these or other fuels.

The exhaust system 74 is adapted to remove excess heat and exhaust gases from the generator 54, such as those that may be generated by the engine 70. The exhaust system 74 may include fans, vents, pumps, heat exchangers, etc.

The electronics 76 generally control the operation of the various components of the generator 54. In an embodiment, the electronics 76 include the necessary hardware and software for controlling the components of the generator 54 and for achieving bi-directional communication with the components of the powertrain 10 of the electrified vehicle 12. The electronics 76 may include various control units, voltage regulators, switches, etc.

The generator 54 could optionally include one or more power outlets 32. The power outlets 32 may be accessible from an exterior of the enclosure 68. The owner/user of the electrified vehicle 12 may plug any tools or other electrical accessories into the power outlets 32 in order to power these tools using energy provided by the generator 54. Thus, in addition to providing power to the powertrain 10, the generator 54 could additionally power various accessory devices.

Figure 5:
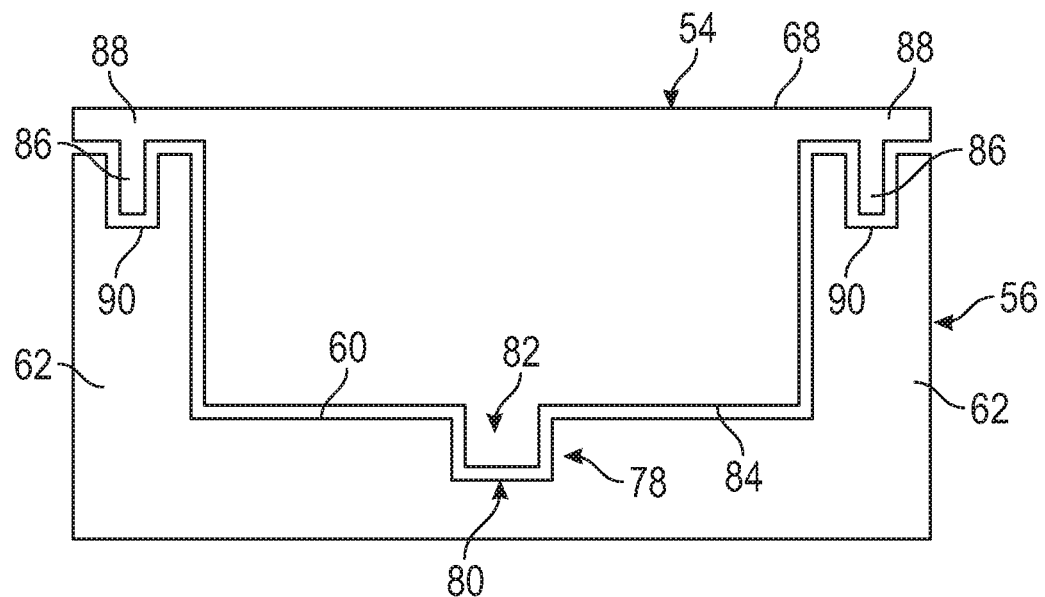
FIG. 5 illustrates a connection system for connecting a generator to a voltage bus of an electrified vehicle.

FIG. 5, with continued reference to FIGS. 1, 2, 3, and 4, illustrates a connection system 78 for electrically connecting the generator 54 to the voltage bus 22 of the electrified vehicle 12. The connection system 78 may include a vehicle-side connector 80 and a generator-side connector 82. In an embodiment, the vehicle-side connector 80 is rigidly disposed within the floor 60 of the truck bed 56, and the generator-side connector 82 is rigidly disposed in a bottom wall 84 of the enclosure 68 of the generator 54. In another embodiment, the vehicle-side connector 80 is a female connector and the generator-side connector 82 is a male connector. However, an alternative configuration is also contemplated in which the vehicle-side connector 80 is the male connector and the generator-side connector 82 is the female connector. The generator-side connector 82 may be plugged into the vehicle-side connector 80 to connect the generator 54 to the voltage bus 22.

The connection system 78 may additionally include one or more locating features for aligning the generator-side connector 82 with the vehicle-side connector 80 as the generator 54 is moved into position within the truck bed 56. In an embodiment, the enclosure 68 of the generator 54 includes locating studs 86 that protrude inwardly from mounting flanges 88 located at each opposing side of the enclosure 68. The locating studs 86 may be received within openings 90 formed in the side walls 62 of the truck bed 56. The locating studs 86 may be slid into the openings 90 to align the generator-side connector 82 with the vehicle-side connector 80. Therefore, as the generator 54 is moved further toward the floor 60 during installation, the generator-side connector 82 will be properly positioned for engaging the vehicle-side connector 80.

Figures 6, 7:
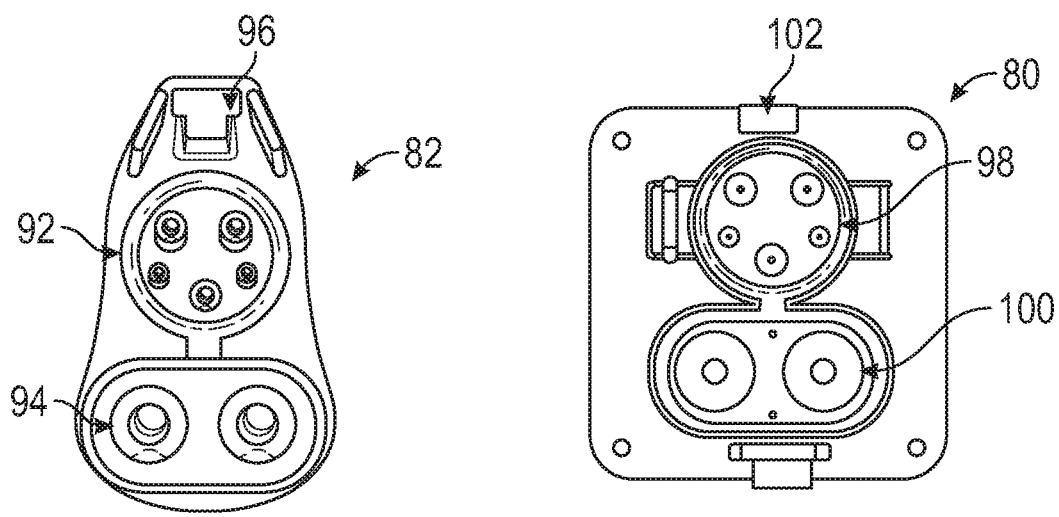
FIG. 6 illustrates a generator-side connector of the connection system of FIG. 5.
FIG. 7 illustrates a vehicle-side connector of the connection system of FIG. 5.

FIG. 6 illustrates the generator-side connector 82 of the connection system 78. The generator-side connector 82 may slightly protrude outwardly from the bottom wall 84 of the enclosure 68. The generator-side connector 82 may include low voltage connection ports 92 and high voltage connection ports 94. Of course, the generator-side connector 82 could embody other configurations within the scope of this disclosure.

The high voltage connection ports 94 allow the generator 54 to be connected with the battery pack 24 and/or the inverter 26. The low voltage connection ports 92 allow for CAN communication between the generator 54 and the battery pack 24, the inverter 26, or other components of the powertrain 10.

The generator-side connector 82 may additionally include a lock actuator 96. The lock actuator 96 is configured to prevent removal of the generator-side connector 82 from the vehicle-side connector 80 while the electrified vehicle 12 is operating (i.e., ignition is turned ON).

FIG. 7 illustrates the vehicle-side connector 80 of the connection system 78. The vehicle-side connector 80 may be slightly recessed into the floor 60 of the truck bed 56. The connection ports of the vehicle-side connector 80 may generally mirror those of the generator-side connector 82 and may include low voltage connection ports 98, high voltage connection ports 100, and a lock actuator 102. The battery-side connector 82 could embody other configurations within the scope of this disclosure.

The battery pack 24 and the generator 54 of the electrified vehicle 12 may be controlled to simultaneously output power for powering the electric machine 14 of the electrified vehicle 12. The electric machine 14 may then output torque for propelling the one or more drive wheels 18 of the electrified vehicle 12.

As shown in FIG. 8, the battery pack 24 and the generator 54 can be controlled by a control system 99 to provide power to the electric machine 14 in parallel with one another. The control system 99 may include hardware, software, or both, for performing the necessary control functions for outputting power from the battery pack 24 and the generator 54. Although shown as a single hardware device, the control system 99 could include multiple controllers in the form of multiple hardware devices, or multiple software controllers within one or more hardware devices. In addition, the control system 99 may include one or more processing units and non-transitory memory for executing the various control strategies and modes of the electrified vehicle 12.

The control system 99 may be programmed to control the amount of power outputted by each of the battery pack 24 and the generator 54 during each operating mode of the electrified vehicle 12. In an embodiment, the control system 99 automatically commands the generator 54 'ON' if a power demand of the electrified vehicle 12 exceeds a predefined power threshold. In another embodiment, the control system 99 automatically commands the generator 54

'ON' if the state of charge (SOC) of the battery pack 24 falls below a predefined threshold.

In yet another embodiment, the control system 99 is programmed to control the power outputted by each of the battery pack 24 and the generator 54 during a given drive cycle based on inputs from the customer/user. For example, the electrified vehicle 12 may include a human machine interface (HMI) 104 that is in electrical communication with the control system 99. The HMI system 104 may be located within the passenger cabin 58 of the electrified vehicle 12 and may include one or more user interfaces 106. The customer/user may interact with each user interface 106 via a touch screen, tactile buttons, audible speech, speech synthesis, etc. The customer/user can either enter information into the user interface 106, or the user interface 106 can display information back to the customer/user.

In an embodiment, the customer/user can manually turn the generator 54 'ON' using the HMI 104 to provide power to the electric machine 14 in parallel with the battery pack 24. This may include toggling a tactile button on the user interface 106 for manually commanding the generator 54 to begin operation.

In another embodiment, the customer/user can use the HMI 104 to select a desired operating mode for controlling the operation of the generator 54 during a given drive cycle. Exemplary operating modes include Maximum Fuel Efficiency Mode, Maximum Power Mode, Maximum Driving Range Mode, and Fuel Optimization Mode. During the Maximum Fuel Efficiency Mode, the engine 70 of the generator 54 may be controlled to operate at predefined revolutions per minute for achieving maximum fuel efficiency of the engine 70. During the Maximum Power Mode, the generator 54 may be controlled to deliver maximum power, thereby providing the powertrain 10 of the electrified vehicle 12 with more energy during high demand situations (e.g., passing situations, trailer-towing situations, starting from standstill, etc.). During Maximum Driving Range Mode, the generator 54 can be controlled to deliver maximum driving range based on the current power consumption of the powertrain 10 of the electrified vehicle 12. During the Fuel Optimization Mode, the engine 70 of the generator 54 may be controlled to operate at an optimal efficiency for powering the electrified vehicle 12 to a given destination (as indicated by an on-board navigation system, for example) using the least amount of fuel as possible. Other operating modes could also be programmed into the control system 99.

Rather than providing power in parallel with the battery pack 24, the generator 54 could alternatively be configured to output power for charging the battery pack 24. As shown in FIG. 9, for example, the generator 54 may be connected in series with the battery pack 24. During certain conditions, the control system 99 may control the generator 54 for replenishing the SOC of the battery pack 24. In an embodiment, the control system 99 automatically commands the generator 54 ON when the SOC of the battery pack 24 falls below a predefined threshold.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
  a drive wheel;
  a battery pack;
  a cargo space; and
  a generator removably positioned within the cargo space and adapted to selectively output power for either charging the battery pack or propelling the drive wheel,
  wherein the generator is box shaped,
  wherein the generator includes locating studs received within openings of the cargo space.

2. The electrified vehicle as recited in claim 1, wherein the generator is interchangeable with a second generator that includes a different power capacity compared to the generator.

3. The electrified vehicle as recited in claim 1, wherein the generator is connected in series relative to the battery pack.

4. The electrified vehicle as recited in claim 1, comprising a control system configured to control the power outputted by each of the battery pack and the generator during a drive cycle.

5. An electrified vehicle, comprising:
  a drive wheel;
  a battery pack;
  a cargo space;
  a generator removably positioned within the cargo space and adapted to selectively output power for either charging the battery pack or propelling the drive wheel,
  wherein the generator is box shaped;
  a control system configured to control the power outputted by each of the battery pack and the generator during a drive cycle; and
  a human machine interface in communication with the control system and configured to receive an operating mode input for controlling the generator during the drive cycle.

6. The electrified vehicle as recited in claim 5, wherein the cargo space is located onboard the electrified vehicle.

7. The electrified vehicle as recited in claim 5, wherein an enclosure of the generator includes a first mounting flange on a first side of the enclosure and a second mounting flange on a second, opposite side of the enclosure, and each of the first and second mounting flanges includes a locating stud for locating the generator relative to the cargo space.

8. An electrified vehicle, comprising:
  a passenger cabin;
  a truck bed rearward of the passenger cabin;
  a generator removably mounted within the truck bed and including an outer enclosure disguised as a saddle-style truck bed toolbox; and
  a connection system including a first connector recessed into a floor of the truck bed and a second connector protruding from a bottom wall of the generator.

9. The electrified vehicle as recited in claim 5, wherein the electrified vehicle is a pickup truck, and the cargo space is established by a truck bed of the pickup truck.

10. The electrified vehicle as recited in claim 5, wherein at least a portion of a bottom wall of the generator is spaced a distance above a floor of the cargo space.

11. The electrified vehicle as recited in claim 5, wherein the generator includes an enclosure that houses an engine and a fuel tank.

12. The electrified vehicle as recited in claim 11, wherein the enclosure further houses an exhaust system and electronics of the generator.

13. The electrified vehicle as recited in claim 5, comprising a connection system for electrically connecting the generator to a voltage bus of the electrified vehicle.

14. The electrified vehicle as recited in claim 13, wherein the connection system includes a vehicle-side connector and a generator-side connector.

15. The electrified vehicle as recited in claim 14, wherein the vehicle-side connector is recessed into a floor of the cargo space and the generator-side connector protrudes from a bottom wall of the generator.

16. The electrified vehicle as recited in claim 14, wherein the vehicle-side connector is a female connector and the battery-side connector is a male connector.

* * * * *